Jan. 20, 1953       W. ERWIN       2,626,162
PERAMBULATOR
Filed Oct. 2, 1950
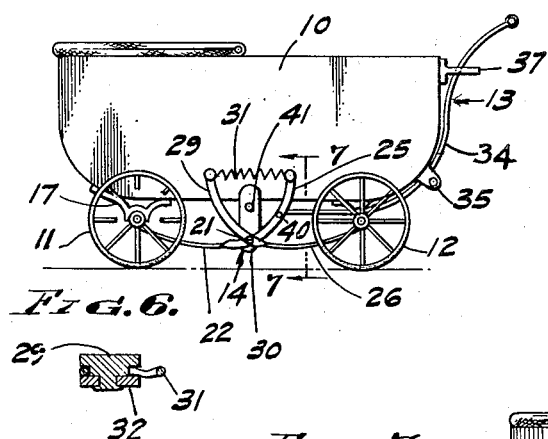
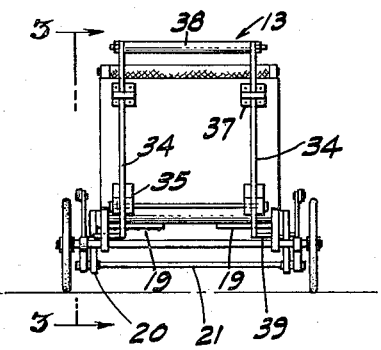
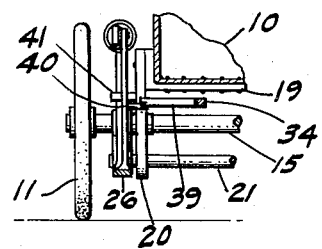
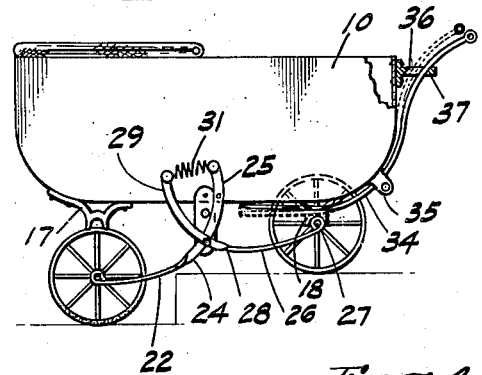
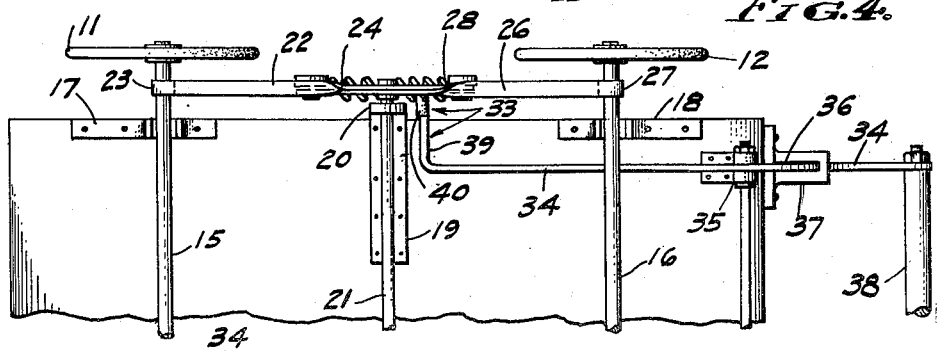
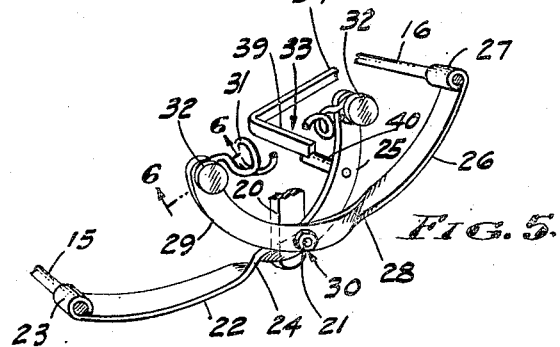
WILHELM ERWIN,
INVENTOR.
ATTORNEY.

Patented Jan. 20, 1953

2,626,162

UNITED STATES PATENT OFFICE 2,626,162

PERAMBULATOR

Wilhelm Erwin, Buenos Aires, Argentina

Application October 2, 1950, Serial No. 187,980
In Argentina October 5, 1949

7 Claims. (Cl. 280—5.28)

The present invention relates to a baby carriage or perambulator, and more particularly has reference to an undercarriage for a vehicle of this type which will maintain the body portion of the vehicle in a horizontal position regardless of the nature of the surface being traversed and at the same time cushion the movement of the body to effect a smooth, easy ride for the occupant.

It has been heretofore proposed to modify the undercarriage of perambulators to enable the vehicle to be wheeled up and down steps and the like with the body remaining in a horizontal location, but these prior constructions have not been fully satisfactory. In the first place, the prior assemblies have been so complex in structural detail that the cost of manufacture is too high to permit widespread use of the carriages. Additionally, the upkeep and maintenance of the vehicles is a further problem by virtue of the numerous essential working parts of the undercarriage. Also, the means whereby the movable wheels are moved relative to the fixed wheels to maintain the body horizontal are somewhat difficult to operate and requires care on the part of the operator of the vehicle and this is not desirable.

An important object of the invention is to overcome the above and other objectionable features now present in the art.

A further object of my invention is to provide a baby carriage wherein at least one pair of the wheels is movably mounted on the body and is operatively connected to the handle so that a slight displacement of the handle will move the wheels to enable the body to assume a horizontal position during travel of the carriage over obstacles.

Yet another object of the invention is to provide an undercarriage for perambulators which is relatively simple in structural detail, positive and efficient in operation, and which may be easily and cheaply manufactured.

Still a further object of my invention is to provide an undercarriage for baby carriages wherein the wheels are positively locked during normal travel of the vehicle, yet which will permit the front wheels to be quickly released for movement relative to the body when an obstacle is approached.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation of a carriage embodying the present invention.

Figure 2 is an end view of the invention.

Figure 3 is a view taken along the line 3—3 of Figure 2, looking in the direction of the arrows.

Figure 4 is a fragmental bottom view of the carriage shown in Figure 1, but being on an enlarged scale.

Figure 5 is a perspective view of the connection between the front and rear wheel axles.

Figure 6 is a view taken along the line 6—6 of Figure 5, the view being taken in the direction of the arrows.

Figure 7 is a view taken along the line 7—7 of Figure 1, the view being taken in the direction of the arrows.

Viewing the invention broadly, it will be noted in Figure 1 that 10 indicates the body of a conventional perambulator, 11 and 12 front and rear wheels, respectively, 13 an operating handle and 14 a flexible connection between the wheels by means of which the wheel axles may be moved relative to the body.

The wheels 11 and 12 are each provided with axles 15 and 16, the axles normally being journalled in spaced bearing brackets 17 and 18 suitably affixed to the lower wall of the body adjacent the front and rear ends of the body. A transverse supporting plate 19 is also attached to the lower wall of the body at approximately the longitudinal center thereof and supports a depending bracket 20 at each end thereof. An axle 21 is rotatably mounted at each end in the bracket 20 and forms the pivot point of the flexible connection 14, to be later more fully described.

The connection 14 includes a pair of parallel arms 22 each of which is connected at its front end to the axle 15, as at 23. The arm 22 is twisted intermediate its length as shown at 24 and terminates in an upwardly curved portion 25. A similar pair of arms 26 are attached to the rear axle as indicated at 27 and is provided with a twisted portion 28 and upwardly curved end portion 29. The arms 22 and 26 are supported by the axle 21 at their crossover point depicted at 30.

A helical spring 31 is secured at each end thereof to the upwardly curved portions 25 and 29 of the arms 22 and 26, by a detachable connection 32 (Figure 6). The spring 31 tends to move the portions 25 and 29 together but the arms 22 are normally held apart by a locking unit 33.

The handle includes spaced parallel arms 34 and as shown in Figures 1 and 3, the arms are of a configuration which conforms to the external contour of the carriage, the arms being mounted on supports 35 carried by the rear wall of the body so that the arms may have limited rocking movement relative to the body. The upper end of each arm extends through an elongated slot 36 formed in a bracket 37 suitably attached to the rear wall of the body near the upper end thereof, and the slot is of such length as to enable the arm to move from the dotted line position to the full line position (Figure 3). A hand grip 38 of any desirable type extends between the free ends of the arms for the customary purpose.

The opposite end of each arm 34 is formed with an outwardly projecting extension 39, preferably at right angles to the arm 34, the extension 39 being adapted to engage a pin or lug 40 extending inwardly from the upwardly curved portion 25 of each arm 22. The arrangement is such that when the handle 13 is in its forward position as depicted by the full lines in Figure 1 or the broken lines in Figure 3, the extensions 39 will engage the pins 40 to maintain the upwardly curved portions 25 and 29 in their spaced apart position to insure that the axles will be maintained against the bearing brackets 17 and 18. In this position, the perambulator may be wheeled along level surfaces, but in the event it is desired to descend steps, the handle 13 is moved rearwardly to the full line position of Figure 3, whereupon the extensions 39 will be lifted clear of the pins 40 at which time the springs 31 will then move the upwardly curved portions 25 forwardly, the forward movement being limited by the pin 40 engaging the bracket 20 and by the upwardly curved portion 25 striking a stop 41 on the bracket 20. Hence, it can be seen that the front wheels 11 move downwardly from the bracket 17 in order that the body 10 will be maintained substantially horizontally, as clearly illustrated in Figure 3.

Of course when the wheels are again in the same plane, the extension 39 of the handle will engage the pin 40 and thus lock the front and rear wheels in the position shown in Figure 1.

When ascending a curb or step the carriage is drawn handle foremost and the handle pulled outward to release the front wheels so that the tension of springs 31 assists elevation of the body and the normally rear wheels with relation to the front wheels, which remain at the lower level until they also are pulled over the curb and locked in normal retracted position. Thus, the body is maintained in horizontal position during the passage over the curb.

It can be seen, therefore, that the undercarriage of the present invention is comparatively simple in essential working parts and the front wheels may be readily unlocked with a minimum of effort on the part of the operator to enable the carriage to move over obstacles, and the undercarriage may be installed with conventional perambulators with little modification of the perambulator construction. The device may be readily and inexpensively manufactured, and by reason of the simplicity, repair and upkeep costs may be kept at a minimum.

I claim:

1. A perambulator comprising a body, a handle movably supported by the body, rear wheels journalled on the body, an axle releasably mounted under the front part of the body, front wheels journalled on said front axle, an arm connected to said front axle and extending rearwardly therefrom, a complemental arm extending forwardly from the rear wheels, means pivotally connecting said arms to the body, an extension on each arm extending beyond the pivotal connection, spring means operatively connected to said extensions tending to move the arm connected to the front axle in such manner as to move the front wheels away from the body, and releasably engageable means on said handle and on the arm connected to the front axle for selectively locking the front wheels in retracted position on the body, the arrangement being such that when the handle is moved to a predetermined position the releasably engageable means on the handle and the front axle engaging arm release said arm so that said spring means urges the front wheels downwardly.

2. A perambulator as claimed in claim 1 wherein said complemental means includes a projection on said handle and a pin on the rearwardly extending arm adapted to be engaged by the handle.

3. A perambulator as claimed in claim 1 wherein the means pivotally connecting the rearwardly and forwardly extending arms to the body includes depending brackets supported by the body and a pivot rod journalled in the brackets and coupled to said arms.

4. A perambulator as claimed in claim 3 wherein a stop is provided on each of said brackets for limiting the pivotal movement of the extension on the rearwardly extending arm.

5. A perambulator as claimed in claim 1 wherein said handle comprises spaced parallel arms, means cooperating with said parallel arms for enabling said arms to have limited rocking movement, each of said parallel arms being provided with a right angle extension and each of said extensions on the rearwardly extending arms being provided with a pin adapted to be engaged by the extension to maintain the extension in spaced apart relation.

6. In a perambulator having a body, a pair of spaced bearings on the forward bottom part of the body, a front axle removably journalled in said bearings, wheels on said axle, a pair of transversely spaced arcuate arms pivotally supported on the body, the front end of each of said arms being connected to said front axle and the other end being directed upwardly, a rear axle journalled under the body, a pair of wheels on said rear axle, a second pair of arcuate arms pivotally connected with the body in crossing relation with the first pair of arms, said second pair of arms having their rear ends connected to the rear axle and their forward ends directed upwardly, and a spring connected to the upwardly directed ends of a front arm and a rear arm of each crossing pair to exert tension between said ends of the arms and to bias the axles downward from their bearings.

7. In a perambulator as defined in claim 6, a stud projecting transversely from the rear part of each front arm, a handle pivotally mounted on the body and studs on the handle operative to engage the stud on each front arm to restrain spring biased movement of the latter and maintain the front axle in raised normal position when the handle is in one position and to release said studs on the arms to cause the front axle to drop downward from its bearings when the handle is swung to a second position.

WILHELM ERWIN.

REFERENCES CITED

The following references are of record in the file of this patent:

UNITED STATES PATENTS

| Number | Name | Date |
|---|---|---|
| 1,085,995 | Petter | Feb. 3, 1914 |
| 1,119,002 | Uherkocz | Dec. 1, 1914 |
| 1,388,405 | Clapp | Aug. 23, 1921 |
| 2,025,793 | Tschappat | Dec. 31, 1935 |

FOREIGN PATENTS

| Number | Country | Date |
|---|---|---|
| 254,215 | Great Britain | July 1, 1926 |